June 8, 1937.   L. A. PHILIPP   2,083,396
REFRIGERATING APPARATUS
Filed May 14, 1934
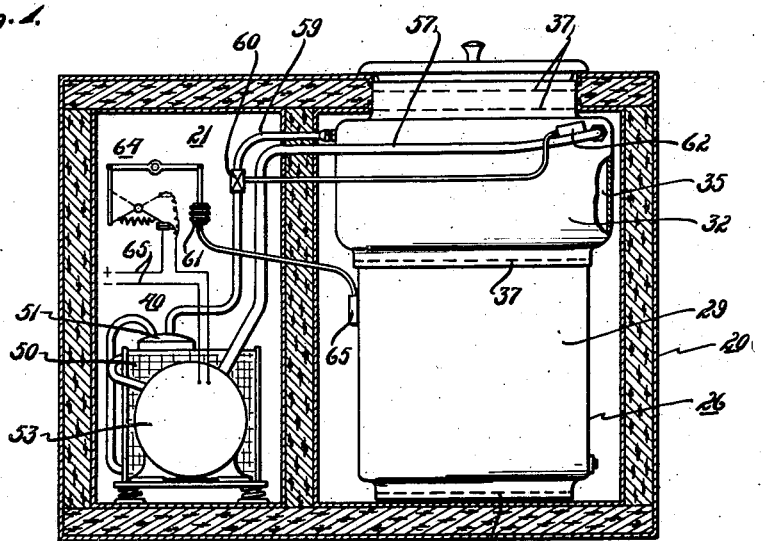
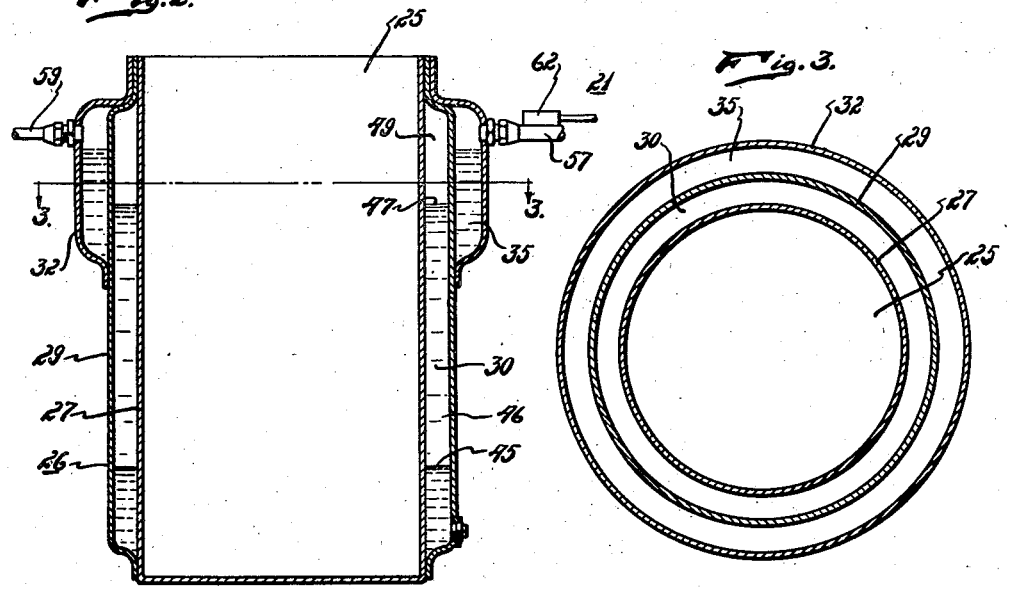
INVENTOR.
LAWRENCE A. PHILIPP
BY
ATTORNEY.

Patented June 8, 1937

2,083,396

UNITED STATES PATENT OFFICE 2,083,396

REFRIGERATING APPARATUS

Lawrence A. Philipp, Detroit, Mich., assignor to Kelvinator Corporation, Detroit, Mich., a corporation of Michigan Application May 14, 1934, Serial No. 725,526

14 Claims. (Cl. 62—170)

My invention relates to refrigerating apparatus of the type having primary and secondary refrigerating systems and more particularly to an improved secondary system and a thermally conductive structure therefor.

In previously known refrigerating apparatus utilizing heat storing liquids such as eutectic or cryohydrate mixtures difficulty has been experienced with particles freezing out of solution and thereby varying its concentration. As a result of this undesirable condition the freezing temperatures of the mixtures have generally varied through a wide range, and they could not be relied upon to maintain a constant temperature within the storage compartment, nor to maintain uniform temperatures on different portions of the compartment wall.

One of the objects of my invention is to provide a refrigerating apparatus having primary and secondary refrigerating system so arranged in thermally coupled relation that such difficulties are eliminated and the efficiency of heat transfer between the primary and secondary systems is improved.

It is also an object of my invention to provide refrigeration apparatus which is adapted to utilize a heat storing brine or eutectic mixture more effectively than has been possible in previously known apparatus.

Another object of my invention is to provide a secondary refrigerating system comprising a refrigerant and congealable agent so disposed in a chamber that they are mixed or agitated by the operation of the system.

In accordance with my invention I provide a refrigerating system comprising a primary refrigerating system arranged in thermally coupled relation with a secondary refrigerating system including a volatile refrigerant and a congealable heat absorbing agent enclosed in a chamber which is associated in thermally coupled relation with the food storage chamber. The vaporization and condensation of the volatile refrigerant in the secondary system maintains a uniform temperature throughout the food storage chamber.

The invention itself, however, both as to its organization and its method of operation, together with additional objects and advantages thereof, will be best understood from the following description of a specific embodiment, when read in conjunction with the accompanying drawing, in which:

Fig. 1 is a view partly in elevation and partly in cross section showing refrigerating apparatus embodying the features of my invention;

Fig. 2 is an enlarged view showing a section taken through the vertical axis of the food storage chamber; and Fig. 3 is a view showing a cross section of Fig. 2.

Referring more specifically to Fig. 1 of the drawing a portable refrigerating apparatus is shown of the type adaptable for keeping ice cream, desserts and the like at the desired temperature. The apparatus comprises in general an insulated cabinet 20, within which is arranged a primary refrigerating system 21, which is arranged to cool a food storage compartment 25 through a secondary refrigerating system associated in heat exchange relation therewith.

A metallic vessel consisting of a sheet metal cylinder 27 comprises a food storage compartment within which food articles to be refrigerated may be stored. The food storage cylinder 27 is closed at one end and a sheet metal sleeve 29 of larger diameter is concentrically disposed over the cylinder to provide a chamber 30 substantially coextensive with the outer wall of the cylinder. A second sheet metal sleeve 32 of large diameter is telescoped concentrically over the first sleeve 29 and formed to cooperate therewith in providing a relatively short chamber 35, which extends around the upper portion of the long chamber 30. The sleeves 29 and 32 are suitably secured together and to the cylinder 27 at both ends in any suitable manner or by welding or soldering as indicated by the dotted lines 37.

The primary refrigerating system comprises in general an intermittently operated condensing element 40 and the chamber 35 which constitutes the vaporizing chamber for the primary system. I have found sulphur dioxide a suitable refrigerant for use in the primary system of my combination. The secondary refrigerating system, which is employed for refrigerating the food storage chamber 25 comprises in general a body of volatile refrigerant which is provided in chamber 30, to the level indicated at 45. This volatile refrigerant is adapted to be evaporated by heat from the food and to be condensed at the top of the chamber 30 by the primary system.

In order to provide for refrigerating the food storage chamber in such a manner as to maintain a uniform temperature throughout its depth and in a manner to increase the rate of heat transfer between the chamber and the primary system I provide a suitable heat retaining medium 46 in chamber 30. This medium is a congealable agent, eutectic solution, or mixture having the characteristic of retaining heat for extensive periods of time and it is provided in the chamber 30 to a level 47 such that a space 49 remains above it for the condensation of the vapor from associated secondary refrigerant 46.

The congealable agent in chamber 30 preferably has a lighter specific gravity than the associated refrigerant so that when the refrigerant is in its liquid state it will collect at the bottom of chamber 30, as shown in Fig. 2.

For the congealable agent in chamber 30 I have found that a brine which can partially freeze is satisfactory. The secondary refrigerant to be used in chamber 30 may be methylene chloride or any volatile substance which when condensed is denser than brine.

Any suitable condensing unit may be used for supplying refrigerant to the vaporizing chamber 35, and such a unit may comprise a condenser 50, a liquid refrigerant receiver 51, and a motor compressor unit preferably enclosed in a sealed casing 53. The compressor withdraws vapor from chamber 35 through a conduit 57 and supplies liquefied refrigerant thereto through a liquid conduit 59 under the control of an expansion valve 60.

The expansion valve 60 is thermostatically controlled in accordance with changes in temperature within the chamber 35 by means of a thermostat bulb 62. The operation of the primary system is preferably controlled in response to changes in temperature of the heat retaining medium 46 within chamber 30 by means of an automatic switch 64. The switch 64 is operated by means of a bellows 61 which in turn is actuated by a fluid containing thermostatic bulb 66 in the well known manner.

Preferably the bulb 66 is arranged in thermal contact with the wall of the chamber 30 adjacent the congealable agent 46 comprising the heat retaining medium so that the fluid in the bulb is responsive to changes in temperature thereof. The switch 64 is adapted to cut the compressor unit motor in and out of circuit with the power mains 65 in accordance with changes in temperature of the refrigerant medium.

In operation the heat of the mixture in chamber 30 and of the food storage compartment causes the volatile refrigerant in chamber 30 to boil. When this ebullition takes place the evaporating refrigerant rises and in so doing passes through the congealable mixture 46 to the space 49 thereabove where its remaining latent heat of vaporization is absorbed and it is condensed by the refrigerant in chamber 35. After being condensed the refrigerant then returns through the mixture 46 because of its greater density and descends to the bottom of chamber 30. This passing of the secondary refrigerant through the mixture 46 absorbs the heat therefrom and transfers it to the primary system as the secondary refrigerant is condensed. In this operation the congealable mixture is also effective in condensing a portion of the vapor from the secondary refrigerant when it starts to boil thereby delaying the time when the primary system must start to refrigerate.

As the secondary refrigerant in chamber 30 continues to absorb heat from the mixture 46 the latter is cooled to the congealing temperature and the water in the mixture changes to small particles of ice, but the boiling of the refrigerant through the mixture in the chamber 30 prevents the water from separating out of the solution.

Ordinarily as the heat is removed from a congealable heat retaining mixture such as described, the ice forms at the top of the chamber and becomes solid. This solid ice is objectionable not only because its expansion might cause the destruction of the cooling element, particularly if constructed of sheet metal, but because it also causes a non-uniform temperature throughout the depth of the food storage compartment since the ice has a higher temperature than the balance of the mixture.

In my system this difficulty is avoided since the passage of the secondary evaporating refrigerant through the congealable heat retaining medium not only refrigerates the heat retaining medium but also agitates it and keeps the mixture well mixed so as to prevent the formation of solid ice. The mixture thus being stirred by the evaporating refrigerant takes the form of a slush the fine ice particles being as effectively removed from the mixture in regards to temperature as the solid ice, and also being well distributed through the mixture so as to maintain a uniform temperature throughout the depth of the food storage chamber. It will also be understood that keeping the heat retaining medium well mixed provides for increasing the rate at which heat may be uniformly transferred from the secondary refrigerating system to the primary system.

Another important advantage of the system described in which the heat retaining mixture is kept well mixed is that it serves as a good temperature holdover since the well mixed solution has a large heat capacity for a temperature change, and consequently prolongs the "off phase" of the refrigerating cycle of the primary system. This is accomplished as previously described by controlling the operation of the primary system in response to changes in temperature of the heat retaining medium.

It will be seen that I have provided refrigerating apparatus including a primary refrigerating system and a secondary refrigerating system comprising a volatile refrigerant and a congealable heat retaining mixture enclosed in a thermally coupled chamber to provide for more efficient and uniform refrigeration of a food storage chamber.

Although I have shown and described certain specific embodiments of my invention, I am fully aware that many modifications thereof are possible. My invention, therefore, is not to be restricted except as necessitated by the prior art.

I claim as my invention:

1. In a refrigerator cooling system the combination of means providing a compartment for the storage of food, means providing a chamber in thermally conductive relation therewith, a partially congealable heat absorbing mixture in said chamber for absorbing heat from said compartment, and a volatile refrigerant in said chamber for cooling and mixing said mixture, the refrigerant vapor being lighter than said mixture and the refrigerant condensate being heavier than said mixture.

2. In a refrigerator cooling system the combination of means providing a compartment for the storage of food, means providing a chamber in thermally conductive relation therewith, a partially congealable heat absorbing mixture in said chamber for absorbing heat from said compartment, a volatile refrigerant in said chamber having a condensate heavier and a vapor lighter than said mixture for cooling and mixing said mixture, and means thermally associated with the upper portion of said chamber for condensing said refrigerant.

3. In combination a compartment for storing foods to be refrigerated, a eutectic heat retaining mixture, a chamber for enclosing said eutectic mixture in good thermal contact with the food storage compartment, a volatile heat absorbing means enclosed in said chamber to boil by heat from said compartment and agitate said eutectic mixture, and additional heat absorbing means for absorbing the latent heat of vaporization of the first heat absorbing means.

4. In combination a sheet metal member of cylindrical formation providing a compartment for storing food, a second sheet metal member of larger diameter concentrically disposed over said cylindrical member to provide a chamber, a eutectic mixture and a volatile refrigerant therein the refrigerant vapor being lighter and the condensate being heavier than the mixture, a third sheet metal member cooperating with the second to provide an external chamber, a primary refrigerant supported thereby in thermally conductive relation with a portion of the first chamber for condensing the refrigerant therein.

5. In combination a sheet metal member having a compartment for the storage of food, a second sheet metal member cooperating with the compartment to provide a chamber extending substantially the depth of the food storage compartment, a eutectic mixture and a volatile refrigerant of greater density in said chamber, said chamber having a greater volumetric displacement to provide space for vaporization, a third sheet metal member cooperating with the second to provide an external chamber extending only a portion of the depth of the eutectic mixture chamber and a refrigerant therein for condensing said volatile refrigerant.

6. In combination a compartment for storing foods to be refrigerated, a eutectic heat retaining mixture, a chamber for enclosing said eutectic mixture in thermally coupled relation with the food storage compartment, a volatile refrigerant enclosed in said chamber to boil by heat absorbed from said compartment and agitate said eutectic mixture, means associated with the upper portion of said chamber for condensing said refrigerant, heat dissipating means associated therewith, and automatic thermostatic means for intermittently operating said heat dissipating means to recondense said refrigerant comprising a thermal responsive element associated with said chamber.

7. In combination a compartment for storing foods to be refrigerated, a eutectic heat retaining mixture, a chamber for enclosing said eutectic mixture in thermally coupled relation with the food storage compartment, a relatively dense volatile refrigerant enclosed in said chamber to boil by heat absorbed from said compartment and agitate said eutectic mixture, a primary system vaporizing chamber thermally coupled with the upper portion of said eutectic mixture chamber, a primary refrigerating system associated therewith comprising a compressor unit, and thermostatic means for automatically operating said compressor unit in response to a predetermined temperature of said chamber.

8. A cooling element for refrigerating apparatus comprising, means forming a sealed chamber for enclosing a partially congealable heat absorbing and retaining mixture, and means within said chamber for mixing the mixture during the absorption of heat.

9. In a refrigerating system the combination of means providing a compartment for the storage of food, means providing a hermetically sealed chamber in thermally conductive relation thereto, a congealable heat absorbing mixture in said chamber, and means for mixing the mixture during the absorption of heat.

10. The method of refrigeration which consists in establishing a heat absorbing zone, absorbing the heat therein by a partially congealable heat absorbing mixture, and continuously mixing the mixture by vaporizing and condensing a refrigerant therethrough.

11. In a refrigerator cooling system the combination of means providing a storage compartment, means providing a succession of chambers associated with said compartment in thermally coupled series relation, refrigerant of a volatile nature in said chambers, a heat absorbing mixture in an intermediate one of said chambers, and heat dissipating means associated with an end one of said chambers.

12. The method of refrigeration which consists in simultaneously congealing and mixing at least a portion of a heat retaining mixture by passing vaporized refrigerant through said heat retaining mixture and subsequently condensing said vaporized refrigerant.

13. The method of refrigeration which consists in simultaneously congealing and mixing at least a portion of a heat retaining mixture by passing vaporized refrigerant through said heat retaining mixture, utilizing the congealed mixture as a hold over and condensing the evaporated refrigerant.

14. The method of refrigeration which consists in simultaneously congealing and mixing at least a portion of a heat retaining mixture by passing vaporized refrigerant through said heat retaining mixture, utilizing the congealed mixture as a hold over, condensing the evaporated refrigerant and returning the condensed refrigerant through the body of congealed heat retaining mixture.

LAWRENCE A. PHILIPP.